United States Patent Office 3,458,212
Patented July 29, 1969

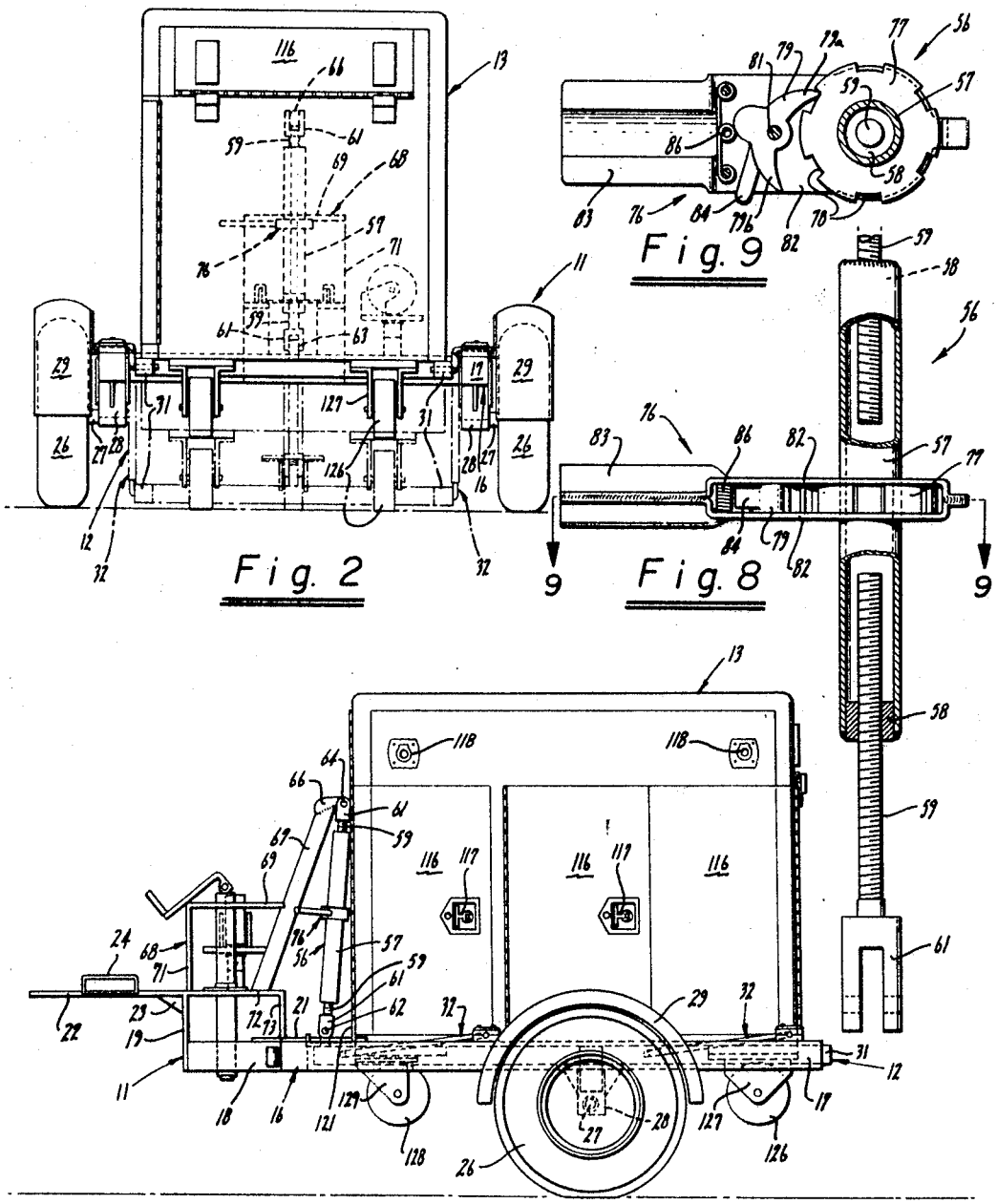

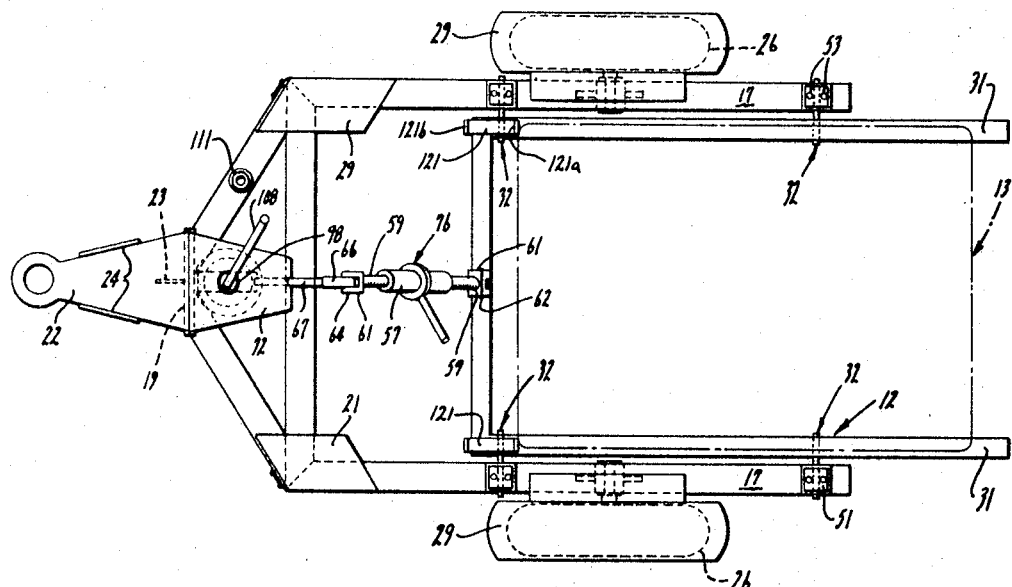

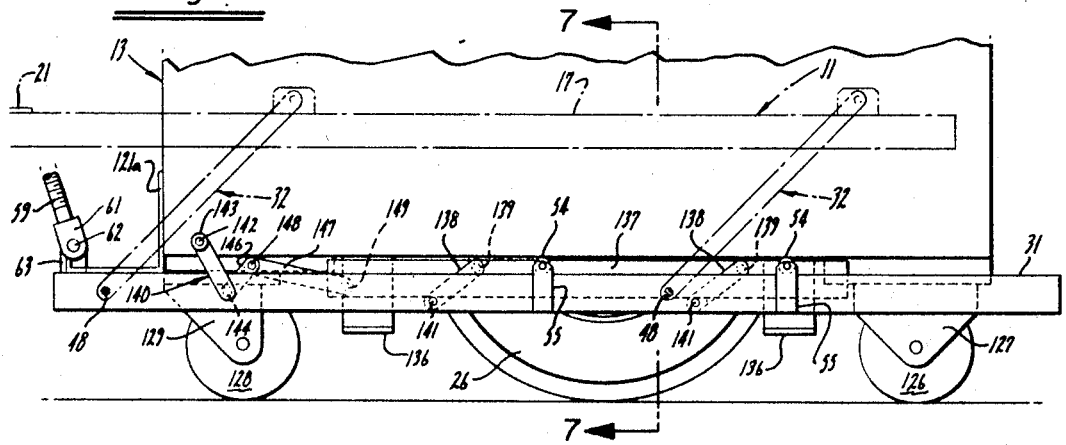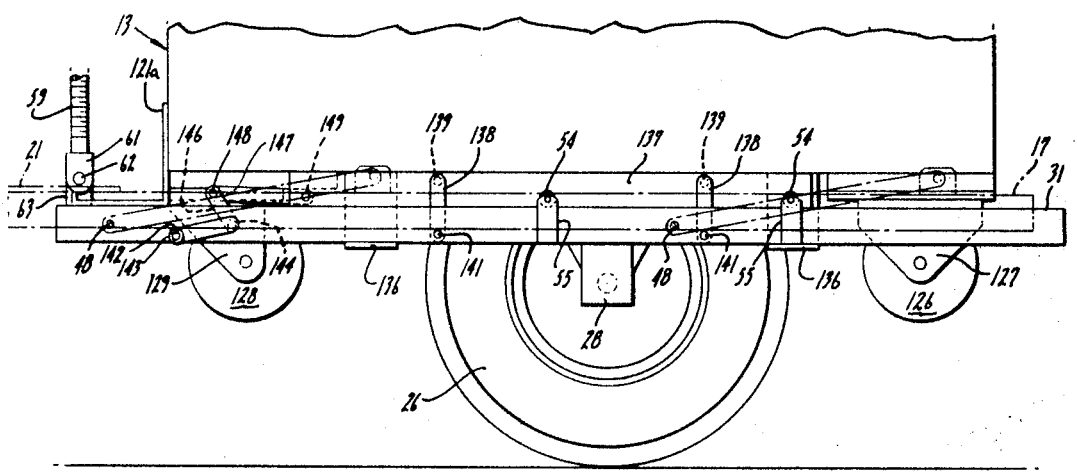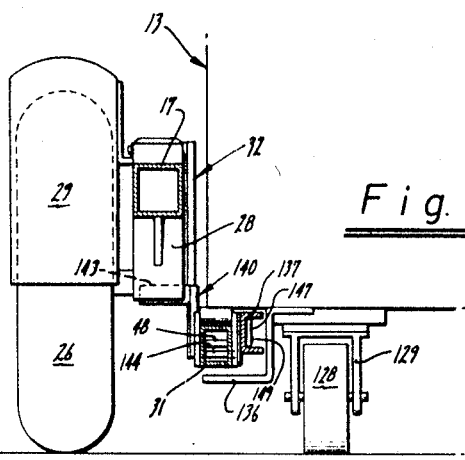

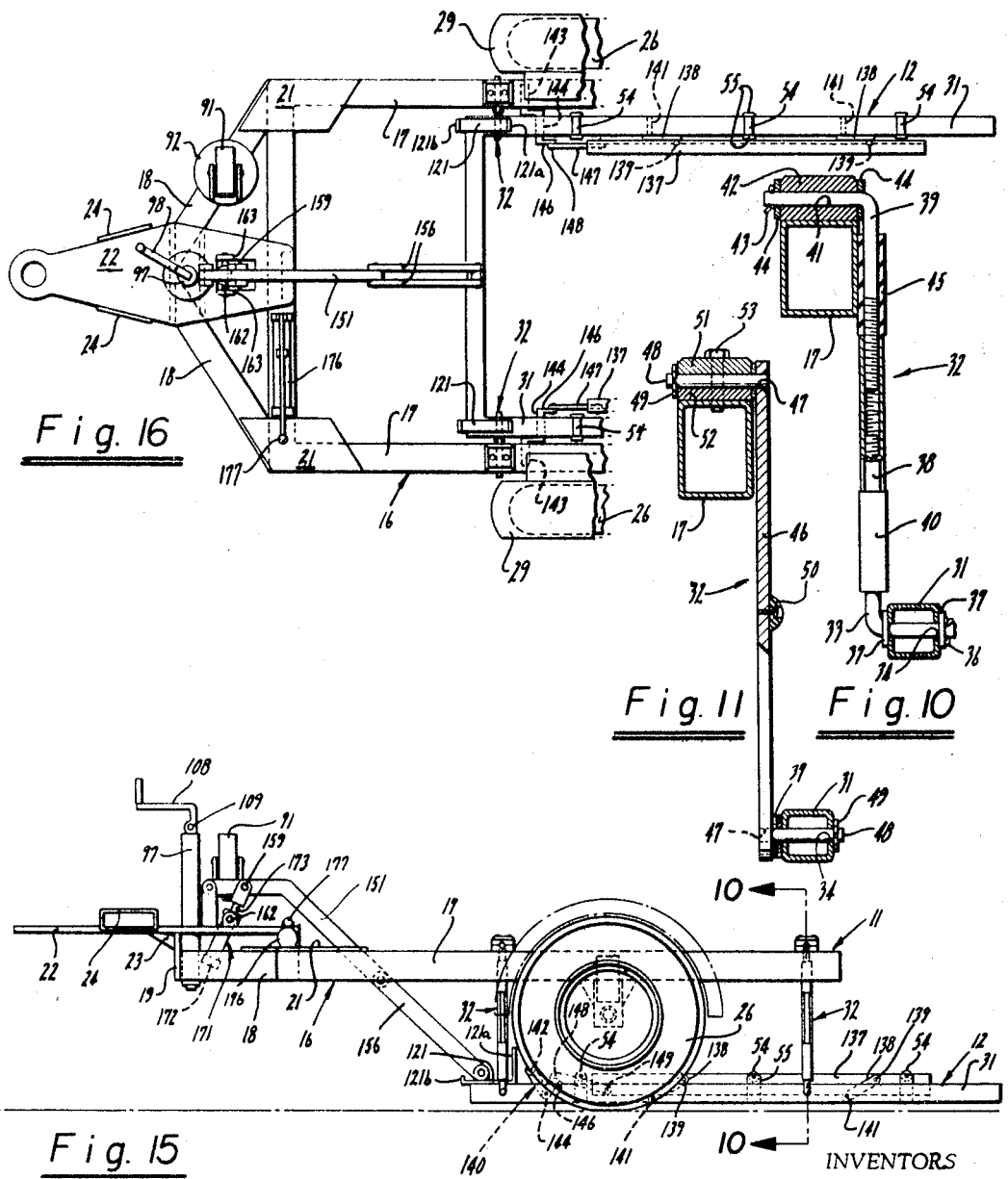

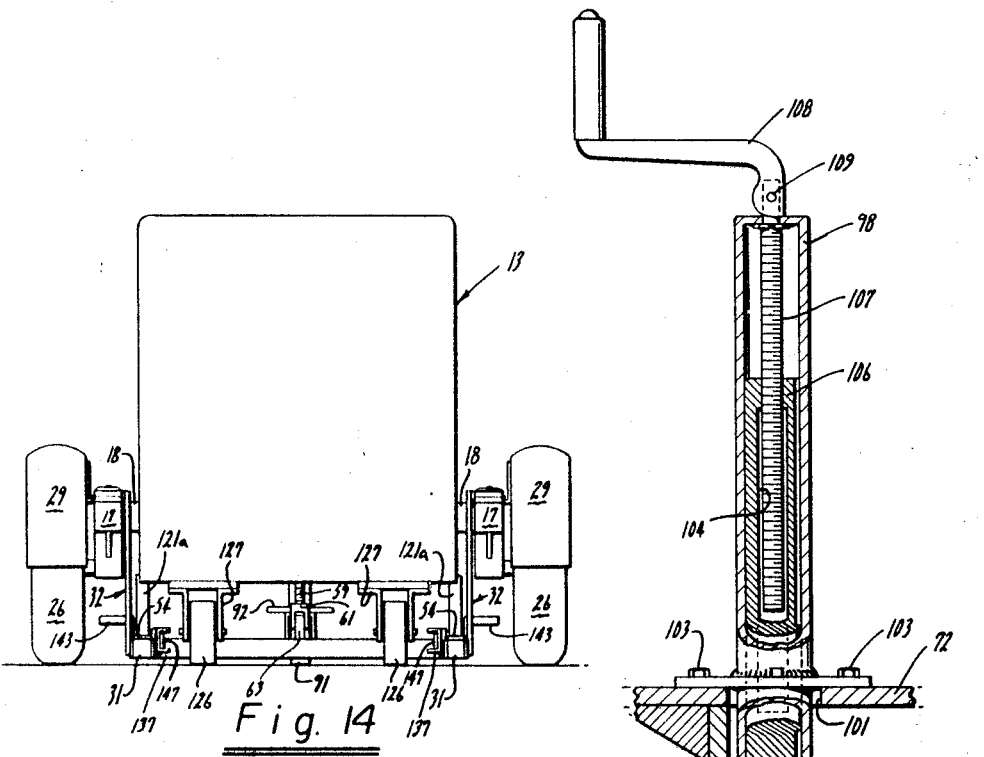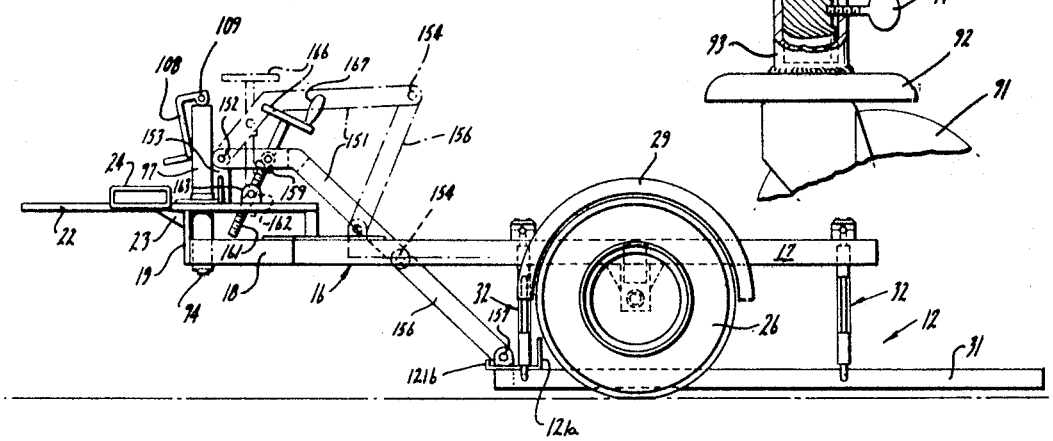

3,458,212
COMBINATION TRAILER-DOLLY WITH REMOVABLE BOX
Montgomery C. Swezy and Robert L. Doyle, Palo Alto, Calif., assignors to Western Progress Inc., Mountain View, Calif., a corporation of Nevada
Filed Jan. 18, 1967, Ser. No. 610,154
Int. Cl. B62d *33/08;* B62b *1/08;* B60p *1/00*
U.S. Cl. 280—43.11                    9 Claims

ABSTRACT OF THE DISCLOSURE

The combination trailer-dolly for use with a removable box consists of a wheeled framework which is open at one side. A lifting framework is provided. Means is provided for securing the lifting framework to prevent raising and lowering of the lifting framework relative to the wheeled framework. Means is mounted on the wheeled framework and is secured to the lifting equipment for raising and lowering the lifting framework relatively to the wheeled framework. The lifting framework is formed so that it is capable of receiving the removable box through the open side of the wheeled framework and to carry the same. Means is also provided which is carried by the wheeled framework and the lifting framework for holding the wheeled framework and the lifting framework in a fixed position when the lifting framework has been raised to its uppermost position with respect to the wheeled framework.

---

This invention relates to a combination trailer-dolly with a removable box.

In the past, cable splicers' carts have been provided for use by cable splicers in splicing telephone cable. However, considerable difficulty has been encountered with the conventional cable splicers' carts and particularly in view of the fact that they are not manufactured so they could receive the delicate instruments which are now being used for the testing and splicing of cable. In addition, difficulty has been found when such cable splicers' carts have been left on location in that the wheels or the tires from the wheels have been stolen. There is, therefore, a need for equipment which can take the place of such cable splicers' carts.

In general, it is an object of the present invention to provide a combination trailer-dolly with removable box which can be utilized by cable splicers.

Another object of the invention is to provide a combination trailer-dolly with removable box of the above character which can be readily moved from one location to another.

Another object of the invention is to provide a combination trailer-dolly with removable box of the above character in which the box can be readily unloaded from the combination trailer-dolly or loaded onto the combination trailer-dolly.

Another object of the invention is to provide a combination trailer-dolly with removable box of the above character in which the combination trailer-dolly can be readily moved to another location after the box has been removed.

Another object of the invention is to provide a combination trailer-dolly with removable box of the above character in which the box can either be of a stationary type or of a type which can be readily moved.

Additional objects and features of the invention will appear from the following description in which the preferred embodiments are set forth in detail in conjunction with the accompanying drawings.

Referring to the drawings:

FIGURE 1 is a side elevational view of a combination trailer-dolly with removable box incorporating the present invention.

FIGURE 2 is a rear elevational view of the combination trailer-dolly with removable box shown in FIGURE 1.

FIGURE 3 is a side elevational view of a combination trailer-dolly with removable box identical to that shown in FIGURE 1 with the exception that the box is of the stationary type which is provided with skids and shows the combination trailer-dolly in a position in which the lifting frame is out of engagement with the box.

FIGURE 4 is a top plan view of the combination trailer-dolly shown in FIGURE 8 showing the box in broken lines.

FIGURE 5 is an enlarged partial side elevational view of the combination trailer-dolly with removable box shown in FIGURE 2 with means for locking the box onto the lifting framework with the lifting framework lowered to release the box and to permit the trailer-dolly to be removed.

FIGURE 6 is a view similar to FIGURE 5 but showing the manner in which the means for locking the box onto the lifting framework operates with the lifting framework in its uppermost position.

FIGURE 7 is a partial end view of the combination trailer-dolly with removable box shown in FIGURES 5 and 6.

FIGURE 8 is a view, partly in cross-section, showing in detail the means utilized in the embodiment shown in FIGURES 1–4 for raising and lowering the lifting frame relative to the wheeled frame.

FIGURE 9 is a cross-sectional view taken along the line 9—9 of FIGURE 8.

FIGURE 10 is an enlarged detailed view, partially in cross-section, showing the linkage connecting the lifting frame to the wheeled frame of the trailer-dolly.

FIGURE 11 is a view similar to FIGURE 7 but showing an alternative arrangement for the linkage.

FIGURE 12 is an enlarged detailed view, partially in cross-section, of the means provided for levelling the wheeled frame.

FIGURE 13 is a side elevational view of another embodiment of the combination trailer-dolly showing hand wheel means for raising and lowering the lifting frame with respect to the wheeled frame.

FIGURE 14 is a rear elevational view of the combination trailer-dolly shown in FIGURE 13 with a removable box.

FIGURE 15 is a side elevational view of another embodiment of the combination trailer-dolly showing hydraulic means utilized for raising and lowering the lifting frame with respect to the wheeled frame.

FIGURE 16 is a partial top elevational view of the combination trailer-dolly shown in FIGURE 15.

In general, the combination trailer-dolly with a removable box includes a wheeled framework which is open at one side. A lifting framework is disposed within the wheeled framework. Means is provided for securing the lifting equipment to the wheeled framework to permit the raising and lowering of the lifting framework relative to the wheeled framework. Means is mounted on the wheeled framework and secured to the lifting framework for raising and lowering the lifting framework relative to the wheeled framework. The lifting framework is formed so that it adapted to receive the removable box through the open side of the framework and to raise and lower the box with respect to the wheeled framework and to carry the same on the wheeled framework.

More particularly as shown in the drawings, the combination trailer-dolly with the removable box consists of a wheeled framework 11 in which a lifting framework 12 is mounted that carries a removable box 13. The wheeled framework 11 consists of a frame 16 which is substantially U-shaped as shown particularly in FIGURE 4 of the drawings and is open on one side, namely, the rear end of the frame. The frame 16 is formed of suitable members such as steel box members 17 which have been cut and welded to form the frame 16. A pair of additional box members 18 are secured to the frame 16 and extend diagonally in a forward direction and are secured to a front plate 19. A pair of reinforcing gusset plates 21 are mounted on the front corners of the frame 16 and to the box members 18 secured to the frame 16. A trailer hitch or tongue 22 of a suitable type such as that shown in the drawings is secured to the front plate 19 and extends outwardly therefrom in a substantially horizontal direction. A reinforcing gusset 23 is provided for securing the hitch 22 to the front plate 19. Hand grips 24 are secured to the tongue 22.

A pair of rubber-tired wheels 26 are mounted on opposite sides of the frame 16 by means of spindles 27 carried by mounting blocks 28 secured to the bottom of the box members 17 forming the frame 16. As can be seen from FIGURES 2 and 4, the wheels 26 are disposed outside of the frame 16. Fenders 29 overlie the wheels and are secured to the side box members 17.

The lifting framework 12, as can be seen from FIGURE 4, is also substantially U-shaped and is formed of suitable material such as steel box members 31 which have been cut and welded together to form the lifting framework. As can be seen from FIGURE 4, the lifting framework is open at one side and, as shown, is open at the rear.

Means is provided for securing the lifting framework to the wheeled framework to permit the lifting framework to be raised and lowered with respect to the wheeled framework and consists of a parallelogram type linkage which includes a pair of arms on each side of the wheeled framework 11 and the lifting framework 12 and which are pivotally mounted both in the wheeled framework and the lifting framework. As can be seen from FIGURE 10, each of the arms 32 consists of an L-shaped member 33 which extends through holes 34 provided in the box members and is secured therein by suitable means such as a cotter key 36. Washers 37 are mounted upon the L-shaped member 33 on opposite sides of the box member 31. The other end of the L-shaped member 33 is threaded into an internally threaded sleeve 38. A resilient bumper sleeve 40 is carried by the member 33. Each of the arms 32 also includes an additional L-shaped member 39, one end of which extends through a hole 41 provided in a bearing block 42 mounted upon a box member 17 of the frame 16. The L-shaped member 39 is retained therein by suitable means such as a cotter pin 43. Washers 44 are mounted on the L-shaped member and are disposed on opposite sides of the mounting block 42. The other end of the L-shaped member 39 is also threaded into the internally threaded sleeve 38. A resilient bumper sleeve 45 is carried by the member 39. In constructing the combination trailer-dolly, the L-shaped members 33 and 39 are both mounted within the respective blocks 42 and the box members 31 after which they are interconnected by the threaded sleeve 38.

An alternative construction for each of the arms 32 is shown in FIGURE 11. In this embodiment, the arm 32 consists of a flat elongate bar 46 in which holes 47 have been drilled in opposite ends. A pair of pins 48 are mounted in the holes 47 and extend at right angles therefrom and are secured therein by suitable means such as welding. The lower pin 48 is secured to the bar member 31 by a snap ring 49 and the top pin 48 is also secured by a snap ring 49. However, in place of the mounting block 42, a split bearing block in the form of upper and lower members 51 and 52 has been provided. The members 51 and 52 are fastened together by cap screws 53. By providing the split bearing block, it is possible to readily connect the lifting framework to the wheeled framework by first placing the lower pins 48 in the box members 31, and thereafter mounting the upper pins 48 in the split bearing blocks 49. A protective bumper block 50 of resilient material is mounted on the bar 46.

In order to facilitate loading of the box onto the lifting framework 12 as hereinafter described, a plurality of rollers 54 are rotatably mounted in pairs of small mounting plates 55 secured to opposite sides of the box members 31 forming the lifting framework 12. Thus, as seen in FIGURE 4, three rollers 54 are provided on each of the sides of the lifting framework 12 and are spaced longitudinally thereof.

In viewing the wheeled framework 11, the lifting framework 12 together with the arms 32 in side elevation, it can be seen that the lifting framework forms one side, the wheeled framework forms one side and two arms 32 form the other two sides of a parallelogram which ensures that the lifting framework will also be maintained in a parallel relationship with respect to the wheeled framework 11.

Means is provided for raising and lowering the lifting framework 12 with respect to the wheeled framework 11 in the form of a raising and lowering assembly 56. This assembly 56 consists of a hollow tube or sleeve 57 which has internally threaded blocks 58 mounted in opposite ends of the tube. A threaded rod 59 is threaded into each of the blocks 58 and extends axially of the tube and is provided with a clevis 61 on the outer end. The clevis 61 on the lower rod 59 is pivotally secured by a pin 62 to an upstanding lug 63 secured to the lifting framework 12 equidistant the side edges thereof and at the front of the lifting framework 12. The clevis 61 on the upper rod 59 is pivotally secured by a pin 64 to a lug 66 mounted upon an upwardly and forwardly extending member 67. This member 67 is rigidly mounted upon the wheeled framework 11 by a box-like construction 68 which consists of a top horizontal plate 69, a vertical plate 71 which is secured to the top plate 69, another horizontal plate 72 which is secured to the front plate 19 and the vertical plate 71, and another rear vertical plate 73 which is secured to the frame 16. As can be seen, the lowermost portion of the member 67 is secured to the plate 72 by suitable means such as welding and an intermediate portion of the member 67 is secured to the horizontal plate 69 by suitable means such as welding.

Means is provided for rotating the sleeve 57 and consists of a ratchet assembly 76. The ratchet assembly 76 consists of a ratchet wheel 77 which is secured to the pipe 57 intermediate the ends thereof. The ratchet wheel 77 is provided with a plurality of recesses 78 which are adapted to be engaged by a pawl 79 which is pivotally mounted upon a pin 81 carried between a pair of parallel plates 82 which are spaced apart to accommodate the ratchet wheel 77 and the pawl 79 and which have their outer extremities bent inwardly and secured together by suitable means such as welding. The forward extremities of the plates 82 are formed into a handle 83. The pawl 79 is provided with tooth portions 79a and 79b which are adapted to engage the recesses 78. A handle 84 is provided on the pawl 79 to shift the pawl to one of two positions to determine which of the two portions 79a or 79b engages the ratchet wheel. Spring means in the form of a spring 86 carried by the plates 82 is mounted between the plates and serves to retain the pawl in either of the two positions to which it has been moved by handle 84.

Means is provided for levelling the combination trailer-dolly and consists of suitable ground engaging means such as a wheel 91 castered upon a mounting plate 92. The mounting plate 92 is provided with a hollow cylindrical boss 93 which is adapted to receive the lower extremity of a larger rod 94. The rod 94 is provided with an elongate slot 96 which is adapted to receive a thumb screw 97 carried by the boss 93 to prevent rotation of the plate 92 with respect to the rod 94. The rod 94 is slidably mounted in a sleeve 98. The sleeve 98 is provided with an indentation 99 which is disposed in the slot 96 to prevent the rod 94 turning relative to the sleeve 98. The sleeve 98 extends through a hole 101 provided in the plate 72 and is secured to the plate 72 by suitable means such as a flange 102 which is welded to the sleeve 98 and secured to the plate 72 by cap screws 103. The large rod 94 is provided with an axial bore 104 in its upper extremity and is provided with a threaded plug 106 mounted in the upper end. A small threaded rod 107 is threaded into the plug 106 and extends into the bore 104. The rod 107 extends through the upper end of the sleeve 98. A crank 108 is pivotally connected by a pin 109 to the rod 107. It can be readily seen that by operating the crank 108, the wheel 91 can be raised and lowered and also can be moved into engagement with the ground to level the wheeled frame 11.

A boss 111 is mounted upon the wheeled framework 11 on one of the members 18 and is adapted to carry the castered wheel 91 when it is not in use, as for example, as shown in dotted lines in FIGURE 2.

As can be seen in the drawings, the removable box 13 is relatively large and is generally rectangular in configuration. The box is provided with a plurality of doors 116 on the sides and on the rear. The doors 116 are provided with conventional door latches 117. The box 13 is constructed to provide a plurality of compartments (not shown) which are adapted to store various types of gear as, for example, test equipment utilized by cable splicers as well as other tools utilized by cable splicers. As can be seen from FIGURES 2, 3 and 4 of the drawings, the box 13 is dimensioned so that it can be received through the open end of the wheeled framework 11. The lifting framework and the box are also designed so that the lifting framework will engage the lower surface of the box to support the same. The box also is provided with lifting hooks 118 which can be utilized when it is desired to move the box by means of lifting cranes and the like.

Stop members 121 are mounted upon the front portion of the lifting framework 12. Each of the stop members is provided with upstanding portions 121a and 121b. The upstanding portion 121a is adapted to limit the forward position of the box 13 upon the lifting framework. The upstanding portion 121b is adapted to engage the gusset plates 21 to limit the upward travel of the lifting framework 12 and also to lock the lifting framework in position when the combination trailer-dolly is being used as a trailer. Rear stop plates 122 are also mounted upon the rear ends of the lifting framework 12 and serve to prevent the box from accidentally slipping off the lifting framework.

Each of the boxes 13 is provided with suitable ground engaging means. Thus, where it is desired to shift the box from one location to another, the box is provided with a pair of rear wheels 126 which are carried by brackets 127 secured to the box. It is also provided with a pair of front wheels 128 rotatably mounted in brackets 129 mounted for pivotal movement of the box 13. With such front and rear wheels 126 and 128, it can be seen that the box can be shifted from one location to another. Where it is desired that the box remain stationary, the box is provided with a pair of skids 131 on opposite sides of the box (see FIGURE 3) and which are provided with vertical reinforcing members 132.

Means is provided for automatically locking the box 13 onto the lifting framework 12 when the lifting framework has been lifted to its uppermost position. This means consists of a pair of Z-shaped members 136 provided on each side of the box and having one leg of the Z-shaped member secured to the bottom of the box and having the other leg extending outwardly in a substantially horizontal direction adapted to engage the bottom of the lifting framework 12 as hereinafter described.

The automatic locking means also includes a pair of U-shaped channel member 137 disposed within the lifting framework 12 adjacent the box members 31 forming the sides thereof. The channel members 137 are connected to the box members 31 forming the sides of the lifting framework 12 by links 138 and by pins 139 which pivotally connect the links to the channel members 137 and pins 141 which pivotally connect the links to the box members 31 forming the sides of the lifting framework 12. The links 138 in conjunction with the channel members 137 and the box members 31 forming the sides of the lifting framework 12 form a parallelogram which ensures that the channel members 137 will always be parallel to the lifting framework 12.

Means is provided for automatically shifting the position of the channel members 137 as the lifting framework 12 is raised into its uppermost position and consists of crank arms 140. Pins 142 are mounted in the outer end of the crank arms and carry rollers 143 which are adapted to engage the lower surface of the box members 17 forming the wheeled framework 11. The crank arms 140 are secured to shafts 144 rotatably mounted in the sides of the box members 31 of the lifting framework 12. Arms 146 are secured to the inner ends of shafts 144. The arms 146 are pivotally connected to links 147 by pins 148. The links 147 are pivotally connected to the forward extremities of the channel members 137 by pins 149.

Operation and use of the combination trailer-dolly with removable box may now be briefly described as follows. Let it be assumed that the combination trailer-dolly with removable box is in the position shown in FIGURE 1 and that it has been transported to the desired location by a suitable vehicle by towing the combination trailer-dolly as a trailer behind the vehicle to that location. Before the combination trailer-dolly is unhitched from the towing vehicle, the castered wheel 91 is placed upon the rod 94 and the thumb screw 97 is threaded into the slot 96. After this has been accomplished, the crank 108 is raised and rotated to move the rod 94 with the wheel 91 carried thereby downwardly until the wheel 91 engages the ground and lifts the front end of the trailer-dolly. Then, if necessary, the trailer-dolly can be unhitched from the towing vehicle. Thereafter, the crank 108 is rotated to position the wheel 91 so that the wheeled framework 11 is substantially parallel to the ground on which the trailer-dolly is resting.

After the trailer-dolly has been levelled, the box 13 carried thereby can be lowered to the ground. This can be accomplished by operating the ratchet assembly 76 in such a direction so as to cause the screws 59 to be extended out of the sleeve 57 and to permit gradual lowering of the lifting framework 12. As the lifting framework 12 is lowered, it swings gradually to the rear with respect to the wheeled framework 11 because of the movement provided by the arms 32. This downward movement continues until the wheels 126 and 128 carried by the box engage the ground. The lifting framework 12 is lowered still further until it clears the bottom of the box 13 as shown in FIGURE 3. As soon as the lifting framework is in this position, the trailer-dolly serves as a dolly and can be moved out from under the box 13 and again connected to the towing vehicle. The trailer-dolly can then be returned to its original location to move another box 13 to another location if desired. Thus, it can be seen that the combination trailer-dolly can be utilized for moving a plurality of boxes to the desired location.

After the box has been moved to the desired location, the individual using the box as, for example, a cable splicer, can perform all of his work without the use of the trailer-dolly. If it is necessary to move the box small distances, the box can be rolled to the desired location on the rollers 126 and 128. If such movement is not necessary, a box 13 with skids 131 can be provided. At the end of each day, the person using the box can lock the box and leave it on location until the job at the location has been finished. During the time that the box is at the location, it is relatively tamper-proof because all the doors can be locked. The trailer-dolly which has been utilized for bringing the box to the location can be stored in a garage or other suitable location to prevent theft of parts therefrom as, for example, the tires and wheels.

Right after the job at the location has been completed, the trailer-dolly is returned to the location and the wheeled framework 11 is again levelled by the use of the third wheel 91. The lifting framework 12 is again lowered to the desired location by the use of the ratchet assembly 76. The trailer-dolly being used as a dolly is then pushed rearwardly so that the box passes through the open end of the wheeled framework 11 and also so that the wheels 128 and 126 of the cabinet pass into the open end of the lifting framework 12. The trailer-dolly is also positioned so that the lifting framework underlies the box 13 and is generally in a position so that the upstanding portions 121a of the stops 121 are in general alignment with the front edge of the box. The rubber bumpers 40, 45 and 50 provided on the arms 32 help to ensure that the box will not be scraped when it is moved onto and off of the lifting framework.

Thereafter, the ratchet assembly 76 is operated to gradually raise the lifting framework relative to the wheeled framework. Initially, the lifting framework 12 engages the bottom of the box. Upon subsequent raising of the lifting framework, the rollers 143 engage the wheeled framework 11 to automatically begin raising the channel members 137 as the lifting framework 12 nears its uppermost position with respect to the wheeled framework 11. Continued upward movement causes gradual raising of the channel members 137 which engage the bottom side of the box. This raising of the channel members 137 causes the lower legs of the Z-shaped members 136 to engage the lower sides of the box members 17 forming the sides of the wheeled framework 11. As soon as this occurs, the box is automatically locked onto the lifting framework 12 because the bottom side of the box is engaged by the channel members 137 and the Z-shaped members engage the bottom side of the wheeled framework 11. In addition, the lifting framework 12 is locked in position with respect to the wheeled framework 11 by engagement of the upstanding portions 121b of the stop plates 121 engaging the gusset plates 21. Thus, the lifting framework is locked with respect to the wheeled framework 11 and the box 13 is locked with respect to the lifting framework and the wheeled framework so that the unitary assembly is formed which can be readily towed at high speeds down highways and the like with adequate clearance below the box.

Another embodiment of the invention is shown in FIGURES 13 and 14. It is very similar to the embodiments hereinbefore described with the exception that the means provided for raising and lowering the lifting framework relative to the wheeled framework 11 is hand-wheel operated. This hand-wheel operated means consists of a pair of arms 151 which are pivotally connected by a bolt 152 to an upstanding lug 153 provided on the plate 72. The other ends of the arms 151 are pivotally connected to a link 156 by a pin 154. The other end of the link 156 is pivotally connected by a pin 157 to a pair of upstanding lugs mounted upon the forward extremity of the lifting framework 12. A trunnion 159 is pivotally mounted on and between the pair of arms 151. A threaded rod 161 is rotatably carried by the trunion 159 and is threaded into another trunion 162 rotatably mounted upon and between a pair of upstanding lugs 163 provided on the plate 72. A hand wheel 166 with a handle 167 is mounted upon the rod 161 and is provided for rotating the rod 161. By rotating the rod 161 by means of the hand wheel 166, it is possible to move the linkage connecting the wheeled framework to the lifting framework in such a manner that it is shifted to the position shown in broken lines in FIGURE 10 and in which the lifting framework is moved to its uppermost position with respect to the wheeled framework 11 with the stop plate 121 in engagement with the gusset plates 21 in the manner hereinbefore described. Thus, it can be seen that the mode of operation of this means for raising and lowering the lifting framework with respect to the wheeled framework is very similar to that shown in the FIGURES 1–7.

Still another embodiment of lifting means is shown in FIGURES 15 and 16 and is very similar to the means provided in FIGURES 13 and 14 with the exception that a hydraulic actuator 171 has been substituted for the hand wheel 166 and the threaded rod 161. Thus, the cylinder 172 is carried by the trunnion 162 rotatably mounted in the upstanding lugs 163. The piston rod 173 of the actuator 171 is connected to the trunnion 159 pivotally mounted on the arm 151. A hand-operated hydraulic pump 176 is mounted upon the tongue 22 and is provided with a lever 177 for operating the same. Thus, when it is desired to lift the lifting framework with respect to the wheeled framework 11, it is merely necessary to operate the pump 176 to cause fluid to be supplied to the hydraulic actuator 171. When it is desired to lower the lifting framework, it is merely necessary to release the hydraulic fluid from the hydraulic actuator 171 by opening a check valve (not shown).

The operation and use of the embodiment of the invention shown in FIGURES 12 and 13 is very similar to that hereinbefore described, the only difference being the manner in which the lifting framework is raised and lowered.

It is apparent from the foregoing that we have provided a combination trailer-dolly with removable box which has many advantageous features. It can be utilized as a trailer for high speed movement of the box from one location to another upon conventional highways. It also can be used as a dolly for raising and lowering the box with respect to the wheeled framework so that the box can be loaded and unloaded from the trailer-dolly without the use of any additional equipment. In addition, means is provided for automatically locking the box to the trailer-dolly so that it will be firmly secured to the trailer-dolly during travel. The trailer-dolly is constructed in such a manner that it can be readily operated by one man with a minimum of effort.

We claim:

1. In a combination trailer-dolly for use with a removable box, a wheeled framework open at one side, a lifting framework adapted to receive and carry the removable box, means including at least two pairs of parallel arms pivotally connected to the lifting framework and to the wheeled framework box securing the lifting framework to the wheeled framework and permitting raising and lowering of the lifting framework in a swinging movement through the open side of the wheeled framework between a raised position and a lowered position, means mounted on said wheeled framework and secured to said lifting framework for moving said lifting framework relative to said wheeled framework between said raised and lowered positions, said lifting framework moving rearwardly through the open side of the wheeled framework as it is moved to the lowered position and said lifting framework in a raised position being generally disposed within the confines of the wheeled framework.

2. A combination trailer-dolly as in claim 1 wherein said means mounted on said wheeled framework and secured to said lifting framework for raising and lowering said lifting framework relative to said wheeled framework includes power means.

3. A combination trailer-dolly as in claim 1 together with means carried by the wheeled framework and the lifting framework for holding the wheeled framework and lifting framework in a fixed position when the lifting framework has been moved to its raised position with respect to the wheeled framework.

4. A combination trailer-dolly as in claim 3 wherein the means holding said lifting framework and said wheeled framework in a fixed position with respect to each other includes plates mounted on said wheeled framework and adapted to be engaged by said lifting framework.

5. The combination of a trailer-dolly with a removable box, said trailer-dolly comprising a wheeled framework open on one side, a lifting framework, means including at least two pairs of parallel arms pivotally connected to the lifting framework and to the wheeled framework for securing the lifting framework to the wheeled framework and permitting raising and lowering of the lifting framework in a swinging movement through the open side of the wheeled framework between a raised position and a lowered position, means mounted on said wheeled framework and secured to said lifting framework for raising and lowering said lifting framework relative to said wheeled framework, said box being removably mounted upon said lifting framework, said lifting framework moving rearwardly through the open side of the wheeled framework as it is moved to the lowered position to facilitate loading and removal of the box, said lifting frame in a raised position being generally disposed within the confines of the wheeled framework.

6. The combination as in claim 5 wherein said box is provided with ground engaging means and wherein said lifting framework is open at one side and is formed to accommodate the ground engaging means of the box.

7. The combination as in claim 5 together with means for retaining said lifting framework in a fixed position with respect to said wheeled framework when said lifting framework has been raised to a predetermined position with respect to said wheeled framework.

8. The combination as in claim 4 together with means carried by the wheeled framework for levelling the wheeled framework.

9. The combination of a trailer-dolly with a removable box, comprising a wheeled framework open on one side, a lifting framework, means securing said lifting framework to said wheeled framework to permit raising and lowering of the lifting framework relative to the wheeled framework, means mounted on said wheeled framework and secured to said lifting framework for raising and lowering the lifting framework relative to said wheeled framework, and means for automatically locking the box onto the lifting framework and the wheeled framework when the lifting framework has been raised to a predetermined position with respect to the wheeled framework said means for automatically locking said box to said lifting framework and said wheeled framework includes a pair of members pivotally connected to said lifting framework and adapted to engage the body of said box, angle members secured to the box and having portions adapted to engage the wheeled framework, and means secured to the lifting framework and engageable with the wheeled framework for raising the members into engagement with the box when the lifting framework reaches a predetermined position with respect to the wheeled framework.

References Cited

UNITED STATES PATENTS

| 2,418,443 | 1/1947 | Wiesner | 254—7 |
| 2,487,508 | 11/1949 | Anderson | 280—43.11 X |
| 3,117,765 | 1/1964 | Chinzzi | 254—2.6 |

BENJAMIN HERSH, Primary Examiner

J. E. SIEGEL, Assistant Examiner

U.S. Cl. X.R.

254—2